United States Patent [19]
Huff et al.

[11] Patent Number: 5,135,241
[45] Date of Patent: Aug. 4, 1992

[54] NON-IMPACT KEYLESS TOOL CHUCK SLEEVE

[75] Inventors: Robert O. Huff, Piedmont; Valerie Owens, Townville, both of S.C.

[73] Assignee: International Business Machines Corporation, Armonk, N.Y.

[21] Appl. No.: 643,185

[22] Filed: Jan. 18, 1991

[51] Int. Cl.⁵ ............................................. B23B 31/02
[52] U.S. Cl. ................................. 279/142; 279/157; 279/902
[58] Field of Search ............... 279/1 R, 1 K, 1 ME, 279/1 Q; 81/16, 3.4, 3.43; 408/240

[56] References Cited

U.S. PATENT DOCUMENTS

| | | | |
|---|---|---|---|
| 3,610,643 | 10/1971 | Ryder | 279/1 Q |
| 4,095,811 | 6/1978 | Cohen | 279/1 K |
| 4,460,296 | 7/1984 | Sivertson, Jr. | 408/124 |
| 4,575,108 | 3/1986 | Whitehead | 279/59 |
| 4,664,394 | 5/1987 | Theissig et al. | 279/1 ME |
| 4,695,065 | 9/1987 | Komatsu et al. | 279/60 |
| 4,695,066 | 9/1987 | Röhm | 279/62 |
| 4,844,488 | 7/1989 | Flynn | 279/1 K |

FOREIGN PATENT DOCUMENTS

| | | | |
|---|---|---|---|
| 2451683 | 5/1976 | Fed. Rep. of Germany | 279/1 ME |
| 2041798 | 9/1980 | United Kingdom | 279/1 K |

*Primary Examiner*—Steven C. Bishop
*Attorney, Agent, or Firm*—Thomas J. Kilgannon; Blaney Harper

[57] ABSTRACT

A keyless tool chuck sleeve is provided for rotary tools which features an elastomeric cover integrally molded to the chuck sleeve to improve the operator's grip during opening and closing of the chuck. The chuck sleeve of the present invention further provides for an abrasion resistant nose, and bit centering and dust guard capabilities.

24 Claims, 3 Drawing Sheets

NON-IMPACT KEYLESS TOOL CHUCK SLEEVE

BACKGROUND OF THE INVENTION

1. Field Of The Invention

The present invention relates to the field of non-impact keyless chucks used in rotary tools, and particularly, to an improved structure for increasing the operator's grip on the chuck barrel while loosening and tightening the chuck to replace a tool bit carried therein.

2. Prior Art

A variety of keyless chucks are known for use in rotary tools, such as hand-held electric drills, wherein the jaws of the chuck are loosened or tightened by the operator gripping an outer sleeve of the chuck barrel and actuating the motor at low speed to drive the jaws open or closed (see, for example, Von Neudeck U.S Pat. No. 1,705,275). Alternatively, the chuck may be opened or closed by the operator gripping front and rear sleeves of the chuck barrel and rotating these parts in opposite directions (see, for example, Komatsu et al. U.S. Pat. No. 4,695,065).

A disadvantage of both of the foregoing arrangements of chuck actuation is that the operator's ability to control the purchase of the chuck jaws on the tool bit is limited by his ability to grip the chuck barrel. Attempts to overcome this problem led to the development of elastomeric sleeves, such as those described in Cohen U.S. Pat. No. 4,095,811, Sivertson, Jr., U.S. Pat. No. 4,460,296, and Flynn U.S. Pat. No. 4,844,488 which are frictionally secured over the chuck barrel to increase the operator's grip. However, frictionally attached elastomeric sleeves may be subject to several shortcomings, including tearing due to wear and slip between the chuck barrel and the elastomeric sleeve at sufficiently high torque levels. Furthermore, because such sleeves require adequate thickness to maintain their structural integrity, their bulk may interfere with efficient use of the tool in some instances.

Another disadvantage of keyless chucks involves centering the tool bit in the chuck while tightening the jaws, especially for those chuck designs requiring the operator to grip both front and rear chuck sleeves. Elastomeric caps have been described for use at the bit-receiving portion of the chuck barrel for the purposes of gripping the bit (as in Whitehead U.S. Pat. No. 4,575,108) and as a dust guard to keep cuttings out of the chuck mechanism (as in Thessig et al. U.S. Pat. No. 4,664,394). Such elastomeric caps are subject to abrasion against the workpiece, which may significantly reduce their useful lifetimes.

In view of the foregoing, it is an object of the present invention to provide a keyless tool chuck sleeve having an integrally molded elastomeric cover which improves the operator's grip on the chuck barrel for loosening and tightening the jaws of the chuck.

It is another object of the present invention to provide a keyless tool chuck sleeve having an integrally molded elastomeric cover which is not subject to slip at high torque levels.

It is further object of the present invention to provide a keyless tool chuck sleeve having an integrally molded elastomeric cover wherein the elastomeric cover is tear-resistant and will not interfere with normal use of the tool.

It is still another object of the present invention to provide a keyless tool chuck sleeve having an integrally molded elastomeric cover with an abrasion-resistant endcap and which centers tool bits within the jaws of the chuck during opening and closing of the chuck.

It is yet another object of the present invention to provide a keyless tool chuck sleeve having an integrally molded elastomeric cover with an abrasion-resistant endcap and which reduces the quantity of dust and cuttings entering the chuck mechanism.

SUMMARY OF THE INVENTION

The present invention relates to a composite tool chuck sleeve for use in a non-impact keyless tool chuck, wherein the chuck sleeve comprises a metallic drawn cup having an elastomeric cover integrally molded thereon. The drawn cup includes a plurality of apertures in it through which the elastomeric cover protrudes to anchor the cover to the drawn cup. The exterior surface of the elastomeric cover is molded into a plurality of low-relief ribs which further increase the operator's grip on the chuck sleeve.

The elastomeric cover also features a bit-centering membrane at the bit-receiving end of the chuck sleeve. This membrane is protected against abrasion by an apertured metallic endcap engaged to the drawn cup. A sealing ring projecting from the bit-centering membrane serves as a dust guard by reducing the quantity of dust and cuttings entering the chuck mechanism.

Further features of the invention, its nature and various advantages will be more apparent from the accompanying drawings and the following detailed description of the preferred embodiments.

BRIEF DESCRIPTION OF THE DRAWINGS

FIG. 1A is a composite drawing showing the relative extremes of the jaw movement within the chuck barrel, the upper and lower halves of the figure showing, respectively, the jaw fully extended and fully retracted.

DETAILED DESCRIPTION OF THE PREFERRED EMBODIMENTS

Figure 1A:
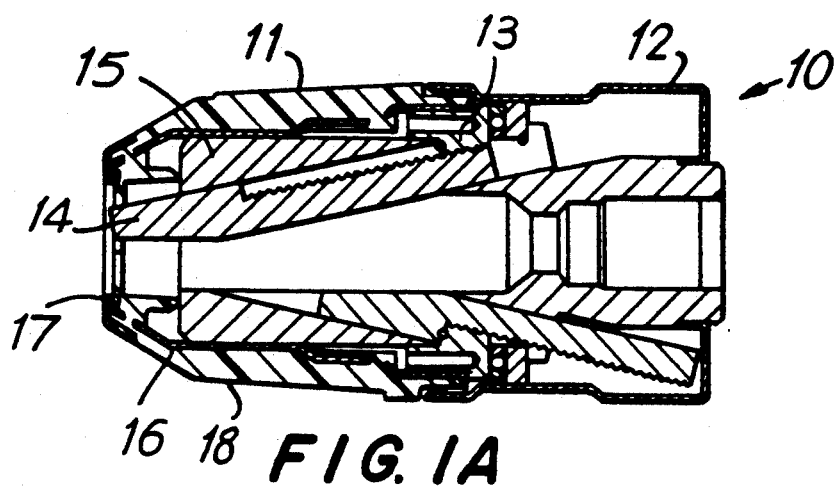
FIGS. 1A and 1B are, respectively, longitudinal sectional and exterior views of a non-impact keyless tool chuck embodying the invention.
Figure 1B:
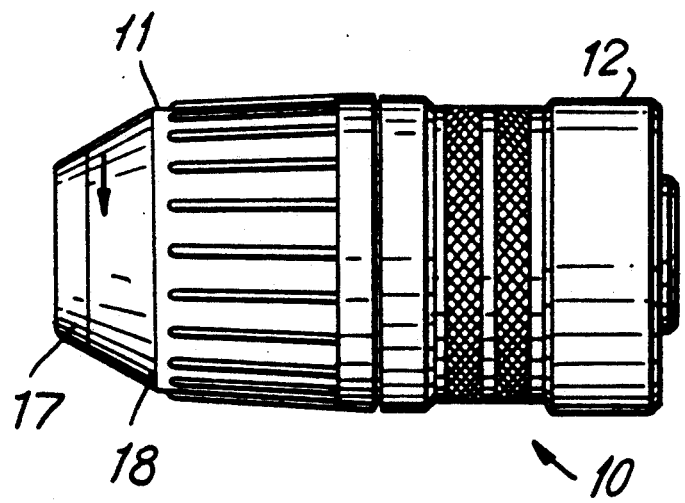

Referring to FIGS. 1A and 1B, a non-impact keyless chuck embodying the elastomer-covered sleeve of the present invention, suitable for use with a rotary electric drill, is described. The internal mechanism of the chuck of FIGS. 1A and 1B is described in commonly assigned copending U.S. patent application Ser. No. 449,722, and forms no part of the present invention. Rather, FIGS. 1A and 1B are merely intended to illustrate application of the present invention to the front sleeve of a keyless tool chuck barrel.

The barrel of chuck 10 of FIGS. 1A and 1B comprises front sleeve 11 and rear sleeve 12 disposed over chuck body 15. Chuck body 15 has three bores angled to intersect at an apex point. Jaws 14 are slidably disposed in the bores in chuck body 15 so that the distal portions of jaws 14 bear against a tool bit disposed therebetween. The threaded proximal portions of jaws 14 engage mating threads in split nut 13. Split nut 13 is press-fit into drawn cup 16 of front sleeve 11. Chuck 10 is opened and closed by grasping the front and rear sleeves 11 and 12, and rotating the sleeves in opposite directions. Such rotation causes the threads of split nut 13 to turn on the mating threads of jaws 14, thereby impelling jaws 14 to either extend from or retract into the cavity in rear sleeve 12 through the bores in chuck body 15.

Front sleeve 11 comprises drawn cup 16 having apertured endcap 17 fastened to the bit-receiving end, and elastomeric cover 18 integrally molded with it, as further described hereinafter. It is to be understood that rear sleeve 12 could also be manufactured with an integrally molded elastomeric cover similar to that of front sleeve 11. Alternately, rear sleeve 12 may be omitted and front sleeve 11 extended to cover the entire length of chuck body 15. This alternative is desirable when a spindle lock is provided on the rotary tool or when the motor is actuated to drive the jaws open or closed.

Figure 2A:
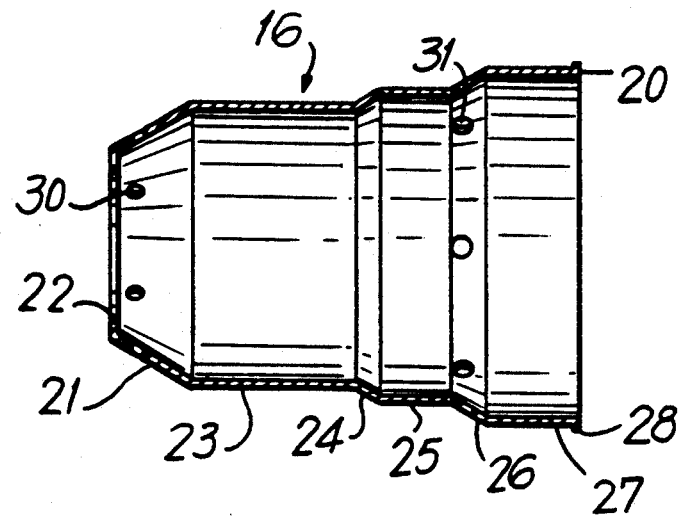
FIGS. 2A and 2B are, respectively, longitudinal sectional and exterior views of the drawn cup of the present invention.
Figure 2B:
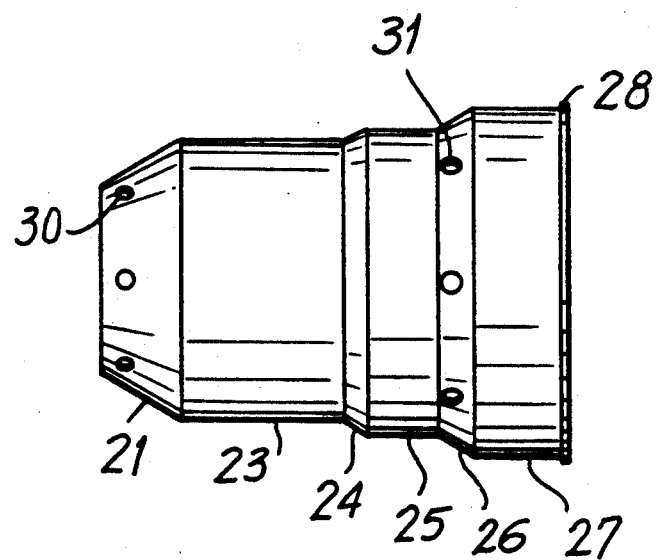

Drawn cup 16 of front sleeve 11 will now be described with reference to FIGS. 2A and 2B. It is to be understood, of course, that the precise shape of drawn cup 16 shown and described herein is illustrative only, and may be adapted for a variety of keyless chuck configurations. Drawn cup a bit center 16 comprises metallic tube 20 having a plurality of cylindrical steps connected by frustoconical transition sections. From its distal toward its proximal ends, tube 20 has frustoconical nose section 21 with radially inward flange 22, and a tubular portion comprising first step 23, first transition section 24, second step 25, second transition section 26, third step 27 and rim 28. First step 23 has the narrowest diameter, third step 27 has the largest diameter and second step 25 has a diameter intermediate that of steps 23 and 27.

First step 23 is the widest of the steps on tube 20, and is designed to so that the distal end of chuck body 15 may be rotatably disposed therein. The intermediate diameter of second step 25 provides for clearance between the anchoring flanges of elastomeric cover 18 and chuck body 15, while the larger diameter of third step 27 accepts split nut 13 which is press-fit therein. Rim 28 protects the proximal end of elastomeric cover a bit center 13 from abrading against rear sleeve 12.

Frustoconical nose section 21 and second transition section 26 each have eight circumferentially spaced apertures 30 and 31 which extend from the exterior surface to the interior surface of the respective portions of tube 20. Apertures 30 and 31 may be holes or may comprise regions where the material of tube 20 has been cut and curled or dented inward. Apertures 30 and 31 permit the elastomeric cover molded around drawn cup 16 to flow into the interior of the drawn cup to anchor the cover, and so that internal features may be produced.

Figure 3A:
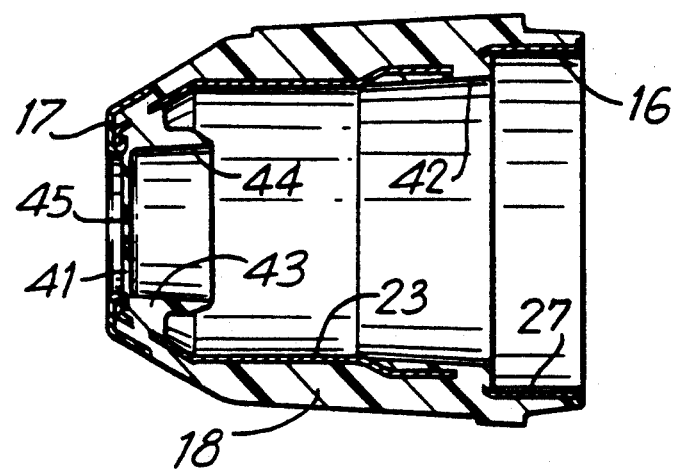
FIGS. 3A and 3B are, respectively, longitudinal sectional and exterior views of the chuck sleeve of the present invention.
Figure 3B:
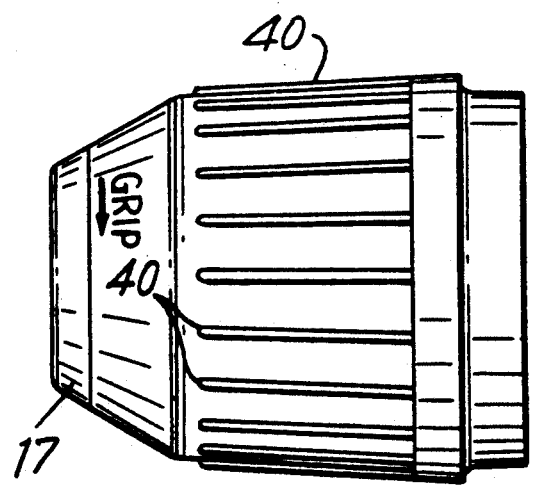

FIGS. 3A and 3B, show completed front sleeve 11, wherein the elastomeric cover has been molded onto drawn cup 16. Front sleeve 11 comprises drawn cup 16 having apertured metallic endcap 17 swaged to radially inward flange 22 of frustoconical nose section 21. Endcap 7 has a concentrically located hole through which a tool bit may be received. The assembly comprising drawn cup 16 and endcap 17 is placed in a mold having detailed internal and external mold portions, and the mold is then filled with an elastomer resin using conventional injection molding techniques. The cured resin forms elastomeric cover 18.

The exterior portion of the injection mold is detailed to produce an elastomeric cover having an approximately uniform thickness over frustoconical nose section 21, a slightly frustoconical outer diameter over steps 23 through 27, and a slightly reduced diameter near the proximal end of step 27. The surface of the elastomeric cover over steps 23 through 27 has a plurality of low-relief ribs 40, preferably twenty, circumferentially spaced around its circumference. The thickness of elastomeric cover 18 on frustoconical nose section 21 abuts against and extends beneath endcap 17, to provide a smooth continuous surface that is flush with the edge of endcap 17. The exterior mold also provides one surface for the formation of bit centering membrane 41 which is formed across the hole in endcap 17.

The interior portion of the injection mold is detailed so that the elastomer resin flowing through row of apertures 31 forms flanges 42, and the elastomer resin flowing beneath the edge of endcap 17 and through row of apertures 30 forms bit centering membrane 41, flanges 43 and sealing ring 44. Flanges 42 and 43 comprise enlargements of the elastomer resin flowing through apertures 30 and 31 to the interior of tube 20. Flanges 42 and 43 may comprise isolated, unconnected enlargements, or may be joined by the interior portion of the injection mold into circular rings disposed against the interior surfaces of steps 25 and 26 and frustoconical nose section 21. Flanges 42 and 43 thereby fasten elastomer cover 18 in place on drawn cup 16, and prevent slipping between the cover and the drawn cup even at high torque.

Bit-centering membrane 41 has a centrally located hole 45 through it for receiving a tool bit therethrough, and acts to grip the tool bit and hold it concentrically within jaws 14 during opening and closing of the chuck. Bit-centering membrane 41 also reduces dust and cuttings from accumulating in and interfering with the operation of jaws 14.

Sealing ring 44 is integrally formed with and projects from the proximal face of flanges 43. Sealing ring 44 cooperates with chuck body 15 to seal the void created when chuck body 15 is disposed in drawn cup 16 (see FIG. 1A). Sealing ring 44 thus prevents dust or cuttings from accumulating in frustoconical nose section 21 of drawn cup 16. The inner diameters of flanges 43 and sealing ring 44 are dimensioned to permit free movement of jaws 14 as required for various diameter tool bits.

An advantage of the present invention is that the integral molding of the elastomeric cover permits formation of bit-centering membrane 41, flanges 42 and 43, and sealing ring 44 in a single operation and with few parts. The use of metallic endcap 17 provides an abrasion-resistant surface at the nose of the tool chuck, thereby overcoming a major disadvantage of previously known tool-gripping caps or dust guards.

It is to be understood that while specific embodiments of the invention have been shown and described in detail to illustrate the application of the inventive principles, the invention is not limited thereto but may be otherwise variously embodied within the scope of the following claims.

What is claimed is:

1. A keyless tool chuck sleeve for use in a chuck for holding a bit on a rotary tool, the chuck comprising the chuck sleeve and a keyless chuck mechanism mounted in the chuck sleeve, the chuck sleeve comprising:

a tube having exterior and interior surfaces, and a portion defining a plurality of apertures extending from the exterior to the interior surfaces of the tube;

an elastomeric cover molded onto the exterior surface of the tube and extending through at least one of the plurality of apertures; and a flange integrally formed with and from the elastomeric cover extending through at least one of the plurality of apertures, said flange comprising a ring which abuts against the interior surface of the tube.

2. A keyless tool chuck sleeve for use in a chuck for holding a bit on a rotary took, the chuck comprising the chuck sleeve and a keyless chuck mechanism mounted in the chuck sleeve, the chuck sleeve comprising:

a tube having exterior and interior surfaces, and a portion defining a plurality of apertures extending from the exterior to the interior surfaces of the tube;

an elastomeric cover molded on to the exterior surface of the tube and extending through at least one of the plurality of apertures;

a flange integrally formed with and from the elastomeric cover extending through at least one of the plurality of apertures; and an endcap having an aperture, the endcap mounted to the tube to prevent abrasion of the elastomeric cover molded on the exterior surface of the tube.

3. The keyless tool chuck sleeve as recited in claim 2 wherein the flange comprises a ring which abuts against the interior surface of the tube.

4. The keyless tool chuck sleeve as recited in claim 3 further comprising a bit centering membrane disposed across the aperture in the endcap and having a portion defining a hole, the bit centering membrane integrally formed with and from the elastomeric cover extending through at least one of the plurality of apertures, so that the bit disposed through the hole in the bit centering membrane is centered in the keyless chuck mechanism during opening and closing of the chuck.

5. The keyless tool chuck sleeve as recited in claim 2 further comprising a sealing ring concentrically disposed within the tube, the sealing ring integrally formed with and from the elastomeric cover extending through at least one of the plurality of apertures, the sealing ring cooperating with the keyless chuck mechanism to prevent dust or cuttings from accumulating in the tube or the keyless chuck mechanism.

6. The keyless tool chuck sleeve as recited in claim 2 wherein the tube comprises a tubular portion and a frustoconical nose section integrally formed with the tubular portion.

7. The keyless tool chuck sleeve as recited in claim 2 wherein the tube comprises at least two steps of different diameter.

8. The keyless tool chuck sleeve as recited in claim 6 wherein the endcap is mounted to the frustoconical nose section.

9. The keyless tool chuck sleeve as recited in claim 4 further comprising a sealing ring concentrically disposed within the tube, the sealing ring integrally formed with and from the elastomeric cover extending through at least one of the plurality of apertures, the sealing ring cooperating with the keyless chuck mechanism to prevent dust or cuttings from accumulating in the tube or the keyless chuck mechanism.

10. A keyless tool chuck sleeve for use in a chuck for holding a bit on a rotary tool, the chuck comprising the chuck sleeve and a keyless chuck mechanism mounted in the chuck sleeve, the chuck sleeve comprising:

a tube having exterior and interior surfaces, and a portion defining a first plurality of apertures extending from the exterior to the interior surfaces of the tube;

a frustoconical nose section integrally formed with the tube and having exterior and interior surfaces, and a portion defining a second plurality of apertures extending from the exterior to the interior surfaces of the frustoconical nose section;

an elastomeric cover molded onto the exterior surface of the tube and the frustoconical nose section and extending through at least one of the first plurality of apertures and at least one of the second plurality of apertures;

a first flange integrally formed with and from the elastomeric cover extending through at least one of the first plurality of apertures in the tube;

a second flange integrally formed with and from the elastomeric cover extending through at least one of the second plurality of apertures in the frustoconical nose section;

an endcap having an aperture, the endcap mounted to the frustoconical nose section to prevent abrasion of the elastomeric cover molded on the exterior surface of the frustoconical nose section;

a bit centering membrane disposed across the aperture in the endcap and having a portion defining a hole, the bit centering membrane integrally formed with and from the second flange, so that the bit disposed through the hole in the bit centering membrane is centered in the keyless chuck mechanism during opening and closing of the chuck;

a sealing ring concentrically disposed within the frustoconical nose section from the second flange and integrally formed with the second flange, the sealing ring cooperating with the keyless chuck mechanism to prevent dust or cuttings from accumulating in the frustoconical nose section or the keyless chuck mechanism.

11. The keyless tool chuck sleeve as recited in claim 10 wherein the tube comprises at least two steps of different diameter.

12. A keyless tool chuck sleeve for use in a chuck for holding bit on a rotary tool, the chuck comprising the chuck sleeve and a keyless chuck mechanism mounted int he chuck sleeve, the chuck sleeve comprising:

a tube having exterior and interior surfaces, and a portion defining a plurality of apertures extending from the exterior to the interior surfaces of the tube;

an elastomeric cover molded onto the exterior surface of the tube and extending through at least one of the plurality of apertures;

a flange integrally formed with and from the elastomeric cover extending through at least one of the plurality of apertures; and a bit centering membrane concentrically disposed within the tube and having a portion defining a hole, the bit centering membrane integrally formed with and from the elastomeric cover extending through at least one of the plurality of apertures, so that the bit disposed through the hole in the bit centering membrane is centered in the keyless chuck mechanism during opening and closing of the chuck.

13. The keyless tool chuck sleeve as recited in claim 12 wherein the flange comprises a ring which abuts against the interior surface of the tube.

14. The keyless tool chuck sleeve as recited in claim 12 wherein the tube comprises a tubular portion and a frustoconical nose section integrally formed with the tubular portion.

15. The keyless tool chuck sleeve as recited in claim 12 wherein the tub comprises at least two steps of different diameter.

16. The keyless tool chuck sleeve as recited in claim 14 further comprising an endcap having an aperture, the endcap mounted to the frustoconical nose section to prevent abrasion of the elastomeric cover molded thereon.

17. The keyless tool chuck sleeve for use in a chuck for holding a bit on a rotary tool, the chuck comprising the chuck sleeve and a keyless chuck mechanism mounted in the chuck sleeve, the chuck sleeve comprising:
- a tube having exterior and interior surfaces, and a portion defining a plurality of apertures extending from the exterior to the interior surfaces of the tube;
- an elastomeric cover molded onto the exterior surface of the tube and extending through at least one of the plurality of apertures;
- a flange integrally formed with and from the elastomeric cover extending through at least one of the plurality of apertures; and
- a sealing ring concentrically disposed within the tube, the sealing ring integrally formed with and from the elastomeric cover extending through at least one of the plurality of apertures, the sealing ring cooperating with the keyless chuck mechanism to prevent dust or cuttings from accumulating in the tube or the keyless chuck mechanism.

18. The keyless tool chuck sleeve as recited in claim 17 wherein the flange comprises a ring which abuts against the interior surface of the tube.

19. The keyless tool chuck sleeve as recited in claim 17 wherein the tube comprises a tubular portion and a frustoconical nose section integrally formed with the tubular portion.

20. The keyless tool chuck sleeve as recited in claim 17 wherein the tube comprises at least two steps of different diameter.

21. The keyless tool chuck sleeve as recited in claim 19 further comprising an endcap having an aperture, the endcap mounted to the frustoconical nose section to prevent abrasion of the elastomeric cover molded thereon.

22. A keyless tool chuck sleeve for use in a chuck for holding a bit on a rotary tool, the chuck comprising the chuck sleeve and a keyless chuck mechanism mounted in the chuck sleeve, the chuck sleeve comprising:
- a tube having an exterior surface;
- an elastomeric cover molded onto the exterior surface of the tube; and
- an endcap having an aperture, the endcap mounted to the tube to prevent abrasion of the elastomeric cover molded on the exterior surface of the tube.

23. The keyless tool chuck sleeve as recited in claim 22 wherein the tube comprises a tubular portion and a frustoconical nose section integrally formed with the tubular portion, the frustoconical nose section having a radially inward flange.

24. The keyless tool chuck sleeve as recited in claim 23 wherein the endcap is mounted to the radially inward flange of the frustoconical nose section.

* * * * *

UNITED STATES PATENT AND TRADEMARK OFFICE
CERTIFICATE OF CORRECTION

PATENT NO. : 5,135,241

DATED : August 4, 1992

INVENTOR(S) : Robert O. Huff and Valerie Owens

Page 1 of 2

It is certified that error appears in the above-identified patent and that said Letters Patent is hereby corrected as shown below:

Title Page, Item [73]: Change "International Business Machines Corporation, Armonk, N.Y." to --Jacobs Chuck Technology Corporation, Wilmington, DE--.

Title Page, Attorney: Change "Thomas J. Kilgannon; Blaney Harper" to --Robert R. Jackson; Nicola A. Pisano--.

| Column | Line | |
|---|---|---|
| 3 | 24 | Delete "a bit center." |
| 3 | 43 | Delete "a bit center." |
| 5 | 11 | Change "took" to --tool--. |
| 5 | 30 | Change "claim 3" to --claim 2--. |
| 6 | 44 | After "holding" insert --a--. |

UNITED STATES PATENT AND TRADEMARK OFFICE
CERTIFICATE OF CORRECTION

PATENT NO. : 5,135,241

DATED : August 4, 1992

INVENTOR(S) : Robert O. Huff and Valerie Owens

It is certified that error appears in the above-indentified patent and that said Letters Patent is hereby corrected as shown below:

Column 6, line 46, change "int he" to --in the--.

Column 7, line 6, change "tub" to --tube--

Column 7, line 13, change "The" to --A--.

Signed and Sealed this

Sixteenth Day of November, 1993

Attest:

BRUCE LEHMAN

Attesting Officer     Commissioner of Patents and Trademarks